United States Patent
Kim et al.

(10) Patent No.: US 7,604,886 B2
(45) Date of Patent: Oct. 20, 2009

(54) POLYMER MEMBRANE FOR FUEL CELL, METHOD OF PREPARING THE SAME, AND STACK FOR FUEL CELL AND FUEL CELL SYSTEM COMPRISING THE SAME

(75) Inventors: Hee-Tak Kim, Suwon-si (KR); Hae-Kwon Yoon, Suwon-si (KR); Jun-Won Suh, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 361 days.

(21) Appl. No.: 11/390,162

(22) Filed: Mar. 28, 2006

(65) Prior Publication Data
US 2007/0059574 A1    Mar. 15, 2007

(30) Foreign Application Priority Data
Mar. 31, 2005    (KR) ...................... 10-2005-0027276

(51) Int. Cl.
*H01M 8/10* (2006.01)

(52) U.S. Cl. ............................ 429/30; 429/33; 427/115
(58) Field of Classification Search .................. 429/30, 429/33, 129; 427/115
See application file for complete search history.

(56) References Cited

U.S. PATENT DOCUMENTS 6,248,469 B1    6/2001    Formato et al.

FOREIGN PATENT DOCUMENTS

| EP | 1 284 518 | * | 2/2003 |
| JP | 09-259924 | | 10/1997 |
| JP | 11-023507 | | 1/1999 |
| JP | 2000-149965 | | 5/2000 |
| KR | 10-2006-0001628 | | 1/2006 |

* cited by examiner

*Primary Examiner*—Patrick Ryan
*Assistant Examiner*—Thomas H. Parsons
(74) *Attorney, Agent, or Firm*—Robert E. Bushnell, Esq.

(57) ABSTRACT

The polymer electrolyte membrane of the present invention includes a porous supporter having pores, and a metal ion adsorptive material and a proton conductive polymer which are present in the pores of the porous supporter.

32 Claims, 4 Drawing Sheets

POLYMER MEMBRANE FOR FUEL CELL, METHOD OF PREPARING THE SAME, AND STACK FOR FUEL CELL AND FUEL CELL SYSTEM COMPRISING THE SAME

CLAIM OF PRIORITY

This application makes reference to, incorporates the same herein, and claims all benefits accruing under 35 U.S.C. §119 from an application for POLYMER MEMBRANE FOR FUEL CELL, METHOD OF PREPARING THE SAME, AND STACK FOR FUEL CELL AND FUEL CELL SYSTEM COMPRISING THE SAME earlier filed in the Korean Intellectual Property Office on 31 Mar. 2005 and there duly assigned Serial No. 10-2005-0027276.

FIELD OF THE INVENTION

The present invention relates to a polymer electrolyte membrane for a fuel cell, a method of preparing the same, and a membrane-electrode assembly for a fuel cell and a fuel cell system comprising the same. More particularly, the present invention relates to a polymer electrolyte membrane for a fuel cell which is capable of minimizing a conductive property decrease thereof caused by metal ions generated from corrosion of a metal separator and improving life-span characteristics of a fuel cell, a method of preparing the same, and a membrane-electrode assembly for a fuel cell and a fuel cell system comprising the same.

BACKGROUND OF THE INVENTION

A fuel cell is a power generation system for producing electrical energy through an electrochemical redox reaction of an oxidant and a fuel such as hydrogen or a hydrocarbon-based material such as methanol, ethanol, natural gas, or the like.

Representative exemplary fuel cells include a polymer electrolyte membrane fuel cell (PEMFC) and a direct oxidation fuel cell (DOFC). The direct oxidation fuel cell includes a direct methanol fuel cell which uses methanol as a fuel. The polymer electrolyte fuel cell is an environmentally friendly energy source for replacing a conventional energy source. It has advantages such as high power output density and energy conversion efficiency, operability at room temperature, and being down-sized and closely sealed. Therefore, it can be applicable to a wide array of fields such as non-polluting automobiles, electricity generation systems, and portable power sources for mobile equipment, military equipment, and the like.

The fuel cell can be classified into a gas-type fuel cell and a liquid-type fuel cell depending on which kind of fuel is used.

The gas-type fuel cell has an advantage of a high energy density, but it also has problems in the need to carefully handle hydrogen gas and the requirement of accessory facilities such as a fuel reforming processor for reforming methane or methanol, natural gas, and the like in order to produce hydrogen as the fuel gas.

On the contrary, a liquid-type fuel cell, which uses a liquid fuel, has a lower energy density than that of the gas-type fuel cell, but it has the advantages of easy handling of the liquid-type fuel, a low operation temperature, and no need for additional fuel reforming processors. Therefore, it has been acknowledged as an appropriate system for a portable power source for small and common electrical equipment.

In the above fuel cell system, the stack that generates electricity includes several to scores of unit cells stacked in multi-layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

The separators not only work as passageways for supplying the fuel required for the reaction to the anode and for supplying oxygen to the cathode, but also as conductors serially connecting the anode and the cathode in the membrane-electrode assembly. The electrochemical oxidation reaction of the fuel occurs at the anode and the electrochemical reduction reaction of oxygen occurs at the cathode, thereby producing electricity, heat, and water due to the migration of the electrons generated during this process.

The polymer electrolyte membrane for the electrolyte is commercially available as a perfluorosulfonate ionomer membrane such as Nafion® (by DuPont), Flemion® (by Asahi Glass), Asiplex® (by Asahi Chemical), and Dow XUS® (by Dow Chemical).

However, since these polymer electrolyte membranes have low mechanical strength, their long-term usage produces pinholes, resulting in the mixing of fuel and oxidant, thereby decreasing the energy conversion rate and deteriorating the output characteristics of the polymer electrolyte membranes. Thicker electrolyte membranes are sometimes used in order to improve mechanical strength, however, this may also increase the volume of the membrane-electrode assembly as well as increase resistance and material cost.

Since an electrolyte of a polymer electrolyte fuel cell is operated in an acidic condition, ions may be generated from corrosion of a metal separator and bind anion groups of a polymer electrolyte membrane to form a complex. Thereby, there are problems that water-absorption of a polymer electrolyte membrane may be reduced and performance of a polymer electrolyte membrane may be deteriorated.

SUMMARY OF THE INVENTION

An embodiment of the present invention provides an electrolyte membrane which is capable of minimizing a property change thereof by metal ions generated from corrosion of a metal separator, and improving life-span characteristics of a fuel cell.

Another embodiment of the present invention provides a method of preparing a polymer electrolyte membrane for a fuel cell.

Yet another embodiment of the present invention provides a membrane-electrode assembly including a polymer electrolyte membrane.

Still another embodiment of the present invention provides a fuel cell system including a polymer electrolyte membrane.

According to one embodiment of the present invention, a polymer electrolyte membrane for a fuel cell includes a porous supporter including pores, preferably micropores, and a metal ion adsorptive material and a proton conductive polymer which are present in the micropores of the porous supporter.

According to another embodiment of the present invention, a polymer electrolyte membrane for a fuel cell is produced by preparing a porous supporter including micropores, and filling a metal ion adsorptive material and a proton conductive polymer in the micropores of the porous supporter.

According to yet another embodiment of the present invention, a membrane-electrode assembly includes an anode and a cathode facing each other with the above polymer electrolyte membrane positioned between the anode and cathode.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The polymer electrolyte membrane according to one embodiment of the present invention includes a metal ion adsorptive material that is capable of forming a complex by adsorbing metal ions generated by corrosion of a metal separator, inside a porous supporter. Thereby, a property change of the polymer electrolyte membrane by metal ions generated from corrosion of a metal separator can be minimized.

Figure 1:
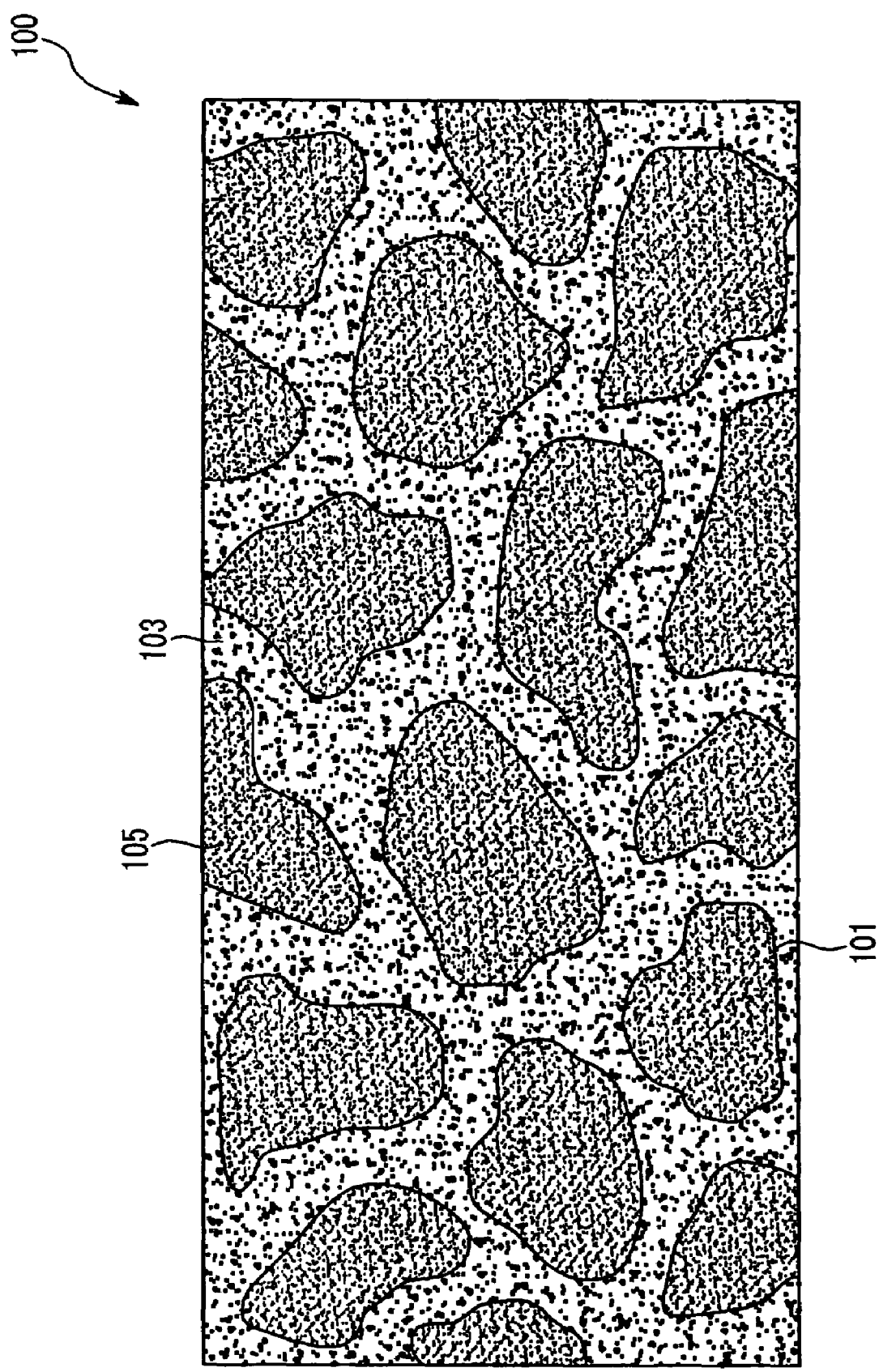
FIG. 1 is a schematic view illustrating an enlarged cross section of a polymer electrolyte membrane for a fuel cell according to one embodiment of the present invention.
Figure 2:
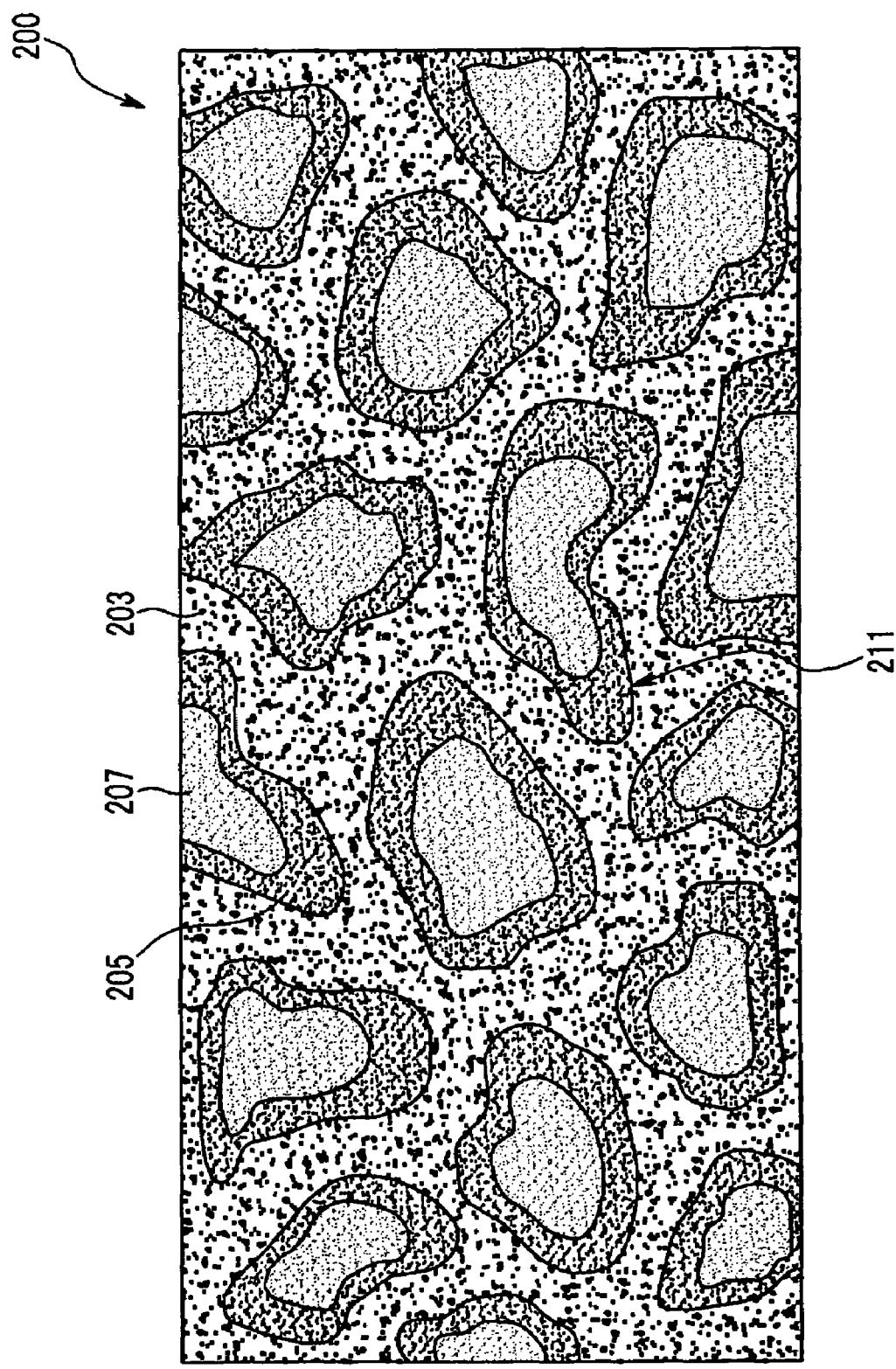
FIG. 2 is a schematic view illustrating an enlarged cross section of a polymer electrolyte membrane for a fuel cell according to another embodiment of the present invention.

FIGS. 1 and 2 are schematic views illustrating an enlarged cross-section of a polymer electrolyte membrane for a fuel cell according to the present invention.

As shown in FIG. 1, in the polymer electrolyte membrane 100 for a fuel cell of the present invention, a metal ion adsorptive material and a proton conductive polymer 105 are filled inside pores (preferably micropores) 101 of a porous supporter 103. As shown in FIG. 2, the polymer electrolyte membrane 200 includes a metal ion adsorptive material layer 205 formed on an inner surface of micropores 211 of a porous supporter 203, and a proton conductive polymer 207 which is present inside micropores of a porous supporter.

The porous supporter has good mechanical strength and therefore can improve dimensional stability of an electrolyte membrane, and can act as a backbone for inhibiting volume expansion caused by water. A material having good mechanical strength and a low volume change due to low hygroscopicity is preferably used for the porous supporter. The porous supporter may be a hygroscopic supporter having a swelling ratio of preferably less than or equal to 5 weight %, and more preferably less than or equal to 1 weight %.

The swelling ratio (%) is calculated as follows:

(weight of absorbed water/(sum of weight of absorbed water and weight of supporter))×100.

When the porous supporter has the swelling ratio of more than 5 weight %, it may be peeled from the interface with an electrode due to volume expansion, and a fuel may be transferred through the porous supporter.

The porous supporter has porosity ranging preferably from 40 to 90 volume % of the entire volume, and more preferably 50 to 80 volume %. When the porosity is less than 40 volume %, a proton conductive polymer cannot be included in micropores in a sufficient amount. In addition, when it is increased to beyond 90 volume %, the increase of mechanical strength is negligible.

The porous supporter may have open-type micropores which are three-dimensionally connected to each other. The micropores of the porous supporter have an average diameter ranging from 1 to 10 μm, and preferably 2 to 5 μm. When the micropores have an average diameter of less than 1 μm, a polymer electrolyte membrane may not have sufficient proton conductivity. In addition, when it is more than 10 μm, pore uniformity may be reduced and a further increase of mechanical strength may be negligible.

The porous supporter of the present invention may be a thin membrane or a non-woven fabric in which the three-dimensionally connected open-type micropores are formed. The porous supporter is also preferably a polymer resin having excellent mechanical strength and low volume change because of its low hygroscopicity. In some embodiments, one or more polymers and their co-polymers may be used. The polymers may be selected from the group consisting of polyolefin fibers, polyester fibers, polysulfone fibers, polyimide fibers, polyetherimide fibers, polyamide fibers, rayon fibers, and glass fibers. In an embodiment, rayon fibers and glass fibers may be the most preferable because of their excellent stability at high temperature.

A metal ion adsorptive material to strongly bind metal ions and a proton conductive polymer are present inside the micropores of the porous supporter. The metal ion adsorptive material and proton conductive polymer are also present on the outer surface of the porous supporter as well as inside the micropores thereof.

When metal ions such as $Fe^{2+}$, $Fe^{3+}$, and so on are diffused into the polymer electrolyte membrane because of corrosion of a metal separator, the metal ions bind to the metal ion adsorptive material to form a stable complex, rather than to the proton conductive polymer. Thereby, a conductivity decrease of the proton conductive polymer can be inhibited.

The metal ion adsorptive material may be a polymer capable of forming a metal complex due to a relative stronger binding force for metal ions than the proton conductive polymer having a —$SO_3H$ group. In one embodiment, it includes at least one selected from the group consisting of a polymer having anions with a large dipole moment such as a —COOH or —OH group, and an inorganic material such as zeolite, silica, or alumina. Preferably, it is at least one selected from the group consisting of a polyhydroxy alkyl methacrylate such as polyacrylic acid, polymethacrylic acid, polyhydroxyethyl methacrylate, zeolite, silica, and alumina, which is capable of forming a large amount of metal complexes per unit weight.

Polymers having a chelating functional group can be used as the metal ion adsorptive material. The chelating functional group includes diamine tetraacetic acid (EDTA) represented by the following Formula 1, and 1,2-cyclohexadiamine tetraacetic acid (CyDTA) represented by the following Formula 2, and nitrilotriacetic acid (NTA):

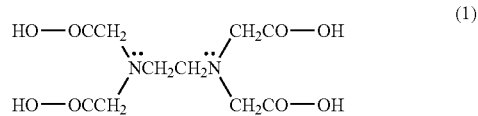

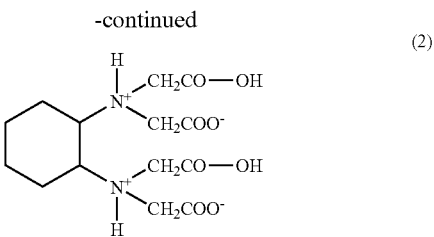

(2)

The chelating functional group may be present in an amount ranging from 2 to 10 mol %, and preferably 5 to 10 mol %. When the amount of the chelating functional group is less than 2 mol %, metal impurities cannot be sufficiently removed, and when it is more than 10 mol %, a further improvement cannot be obtained as the amount increases. The polymer having the chelating functional group is particularly not limited. According to one embodiment, it may be proton conductive polymer such as perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In particular, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly (2,2'-(m-phenylene)-5,5'-bibenzimidazole), and poly (2,5-benzimidazole).

When the metal ion adsorptive material is an inorganic material, a binder may further be used in order to improve adherence between the metal ion adsorptive material and the porous supporter. The binder includes polyacrylic acid, polymethacrylic acid, polyhydroxyethyl methacrylate, perfluoro sulfonic acid, or the like. The binder and inorganic material may be used in a weight ratio of 1:99 to 30:70.

The polymer electrolyte membrane of the present embodiment includes a proton conductive polymer along with the metal ion adsorptive material layer in the micropores of the porous supporter. The proton conductive polymer substantially acts as an electrolyte membrane and forms ion transport pathways by connecting the micropores three-dimensionally to each other.

The proton conductive polymer may be included at 40 to 90 volume %, and preferably 50 to 80 volume % based on the entire volume of a polymer electrolyte membrane, within the porosity range of the porous supporter. When the amount of the proton conductive polymer is less than 40 volume %, proton conductivity is decreased. In addition, when it is more than 90 volume %, volume expansion caused by moisture may occur and mechanical strength is lowered.

The proton conductive polymer may be a hygroscopic polymer having a swelling ratio of 5 to 50 weight %, and more preferably 10 to 30 weight %. The swelling ratio (%) is calculated as follows:

(weight of absorbed water/(sum of weight of absorbed water and weight of polymer))×100. When the proton conductive polymer has the swelling ratio of less than 5 weight %, the proton conductivity may decrease. However, when it is more than 50 weight %, mechanical strength is lowered and crossover of a fuel occurs.

The proton conductive polymer for the electrolyte membrane of the present invention may be any polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer include at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In a preferred embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly (2,2'-(m-phenylene)-5,5'-bibenzimidazole), or poly (2,5-benzimidazole). However, the proton conductive polymer included in the polymer electrolyte membrane is not limited thereto.

According to another embodiment of the present invention, as shown in FIG. 2, a metal ion adsorptive material layer 205 is formed inside micropores of a porous supporter 203, and then a proton conductive polymer 207 may be filled therein. The porous supporter, metal ion adsorptive material, and proton conductive polymer are the same as described above. The thickness of the metal ion adsorptive material layer ranges from 0.01 to 1 μm, and more preferably from 0.05 to 0.5 μm. When the thickness of the metal ion adsorptive material layer is less than 0.0 μm, the metal ion adsorption amount is not sufficient, and in the case that excessive metal ions are eluted, all eluted metal ions cannot be adsorbed. However, when it is more than 1 μm, the amount of the proton conductive polymer detrimentally decreases. The proton conductive polymer substantially acts as an electrolyte membrane and forms ion transport pathways by connecting the micropores three-dimensionally.

According to another embodiment of the present invention, a polymer electrolyte membrane is produced by preparing a porous supporter having micropores, and filling a metal ion adsorptive material and proton conductive polymer inside the micropores of the porous supporter.

First, the porous supporter having micropores is prepared. The porous supporter is the same as described above.

For the porous supporter, a thin membrane or non-woven fabric in which three-dimensionally connected open-type micropores are formed may be used. According to the present invention, a method for preparing the thin film or the non-woven fabric is not specifically limited, but in some embodiments, micropores in a thin film can be prepared by such techniques as solvent evaporation, extraction, phase separation, or a conventional method for preparing a non-woven fabric.

For example, a porous polymer membrane can be prepared by any of the following methods: a mixed slurry of a fiber, a binder, and a solvent is coated and then the solvent is evaporated; a polymer solution with a polymer homogeneously dissolved in a solvent is coated and then the solvent is fast volatilized to form pores; or a polymer solution with a polymer homogeneously dissolved in a solvent is soaked in another solvent with a lower affinity for the polymer to induce phase separation.

In addition, a porous polymer membrane can be prepared by an extraction method, wherein a film is prepared by mixing a polymer, a solvent with low volatility, and either an organic compound or an inorganic compound with a weight average molecular weight of not more than 10,000, followed by soaking in a solvent that is capable of selectively dissolving a solvent with low volatility, an organic compound, or an inorganic compound with a weight average molecular weight of not more than 10,000. Further, after preparing a film made of a foaming agent and a polymer, a porous polymer membrane can be prepared by foaming using heat or photo-radiation.

Figure 3:
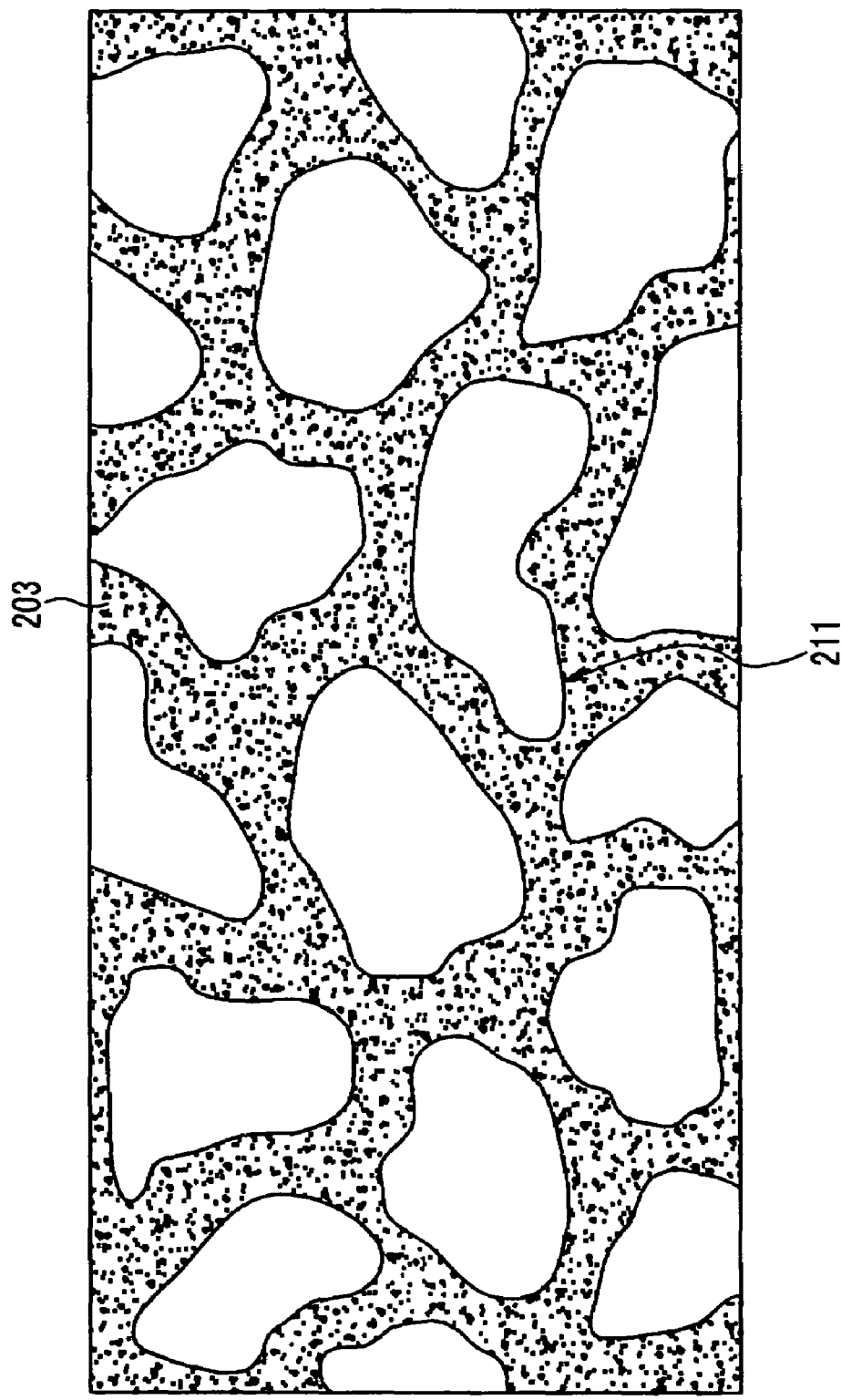
FIG. 3 is a schematic view illustrating an enlarged cross section of a porous supporter having micropores therein.

FIG. 3 is a schematic view illustrating an enlarged cross-section of a porous polymer membrane with micropores.

In FIG. 3, reference numeral 211 denotes micropores and reference numeral 203 denotes a porous supporter.

Following the preparation of the porous polymer membrane, a metal ion adsorptive material and a proton conductive polymer are filled in the micropores. The metal ion adsorptive material and the proton conductive polymer can be coated in a mixed state or coated successively. With successive coating, the order is not particularly limited.

The metal ion adsorptive material and proton conductive polymer are filled in a pre-mixed state. Alternatively, either of the two can be filled first and then the other one can be filled. The metal ion adsorptive material and proton conductive polymer may be filled using at least one selected from the group consisting of dip coating, spraying, screen printing, a method using a doctor blade, and a slot die method.

As described above, a metal ion adsorptive material may be first filled on an inner surface of the micropores of the porous supporter to form a metal ion adsorptive material layer, and a proton conductive polymer is then filled to fabricate a resultant polymer electrolyte membrane.

Firstly, the micropores can be filled by coating a solution including 1 to 50 weight %, preferably 5 to 20 weight %, of the metal ion adsorptive material. When an amount of the metal ion adsorptive material is less than 1 weight %, adsorption of metal ions is not sufficient. On the other hand, when it is more than 50 weight %, it is difficult to make a uniform coating layer because the solution has a high viscosity and cannot invade the pores of the porous supporter.

The metal ion adsorptive material is the same as described above. Non-limiting examples of a solvent used for coating include water, an alcohol-based solvent such as methanol, ethanol, isopropyl alcohol, and the like, an amide-based solvent such as dimethylacetamide, a sulfoxide-based solvent such as dimethylsulfoxide, a polar solvent such as N-methylpyrrolidone, and the like.

The metal ion adsorptive material and proton conductive polymer can be filled using a method selected from dip coating, spraying, screen printing, a method using a doctor blade, or a slot die method.

The formed metal ion adsorptive material layer has the same features as described above.

Secondly, a solution including 1 to 50 weight % and more preferably 5 to 20 weight % of the proton conductive polymer is filled into the micropores of the porous supporter, wherein the metal ion adsorptive material layer is formed on the surface of the pores. When the amount of the proton conductive polymer is less than 5 weight %, the proton conductive polymer may not be filled into all the pores, resulting in empty spaces. When it is more than 20 weight %, the solution has a high viscosity and the inside of the pores cannot be filled. A usable polar solvent includes, for example, an alcohol-based solvent such as methanol, ethanol, isopropyl alcohol, and the like, an amide-based solvent such as dimethylacetamide, or a sulfoxide-based solvent such as dimethylsulfoxide.

A proton conductive polymer is filled into the inside of the pores using a method selected from at least one of the group consisting of dip coating, spraying, screen printing, a method using doctor blade, or a slot die method. The proton conductive polymer forms an ion transport pathway by connecting the micropores three-dimensionally to each other.

The proton conductive polymer may be included at 40 to 90 volume %, and preferably 50 to 80 volume % based on the entire volume of the polymer electrolyte membrane, within the porosity range of a porous supporter. When the amount of the proton conductive polymer is less than 40 volume %, proton conductivity is decreased, and when it is more than 90 volume %, volume expansion caused by moisture may occur.

After that, a roll-pressing process may be performed to uniformly control the thickness of the polymer electrolyte membrane for a fuel cell.

The polymer electrolyte membrane for a fuel cell of the present invention may include a metal ion adsorptive material and a proton conductive polymer without a porous supporter.

The metal ion adsorptive material and the proton conductive polymer is the same as described above. The polymer electrolyte membrane for a fuel cell includes a metal ion adsorptive material and a proton conductive polymer in a weight ratio of 5:95 to 50:50, and more preferably in a weight ratio of 10:90 to 30:70. When the amount of the metal ion adsorptive material is less than the lower limit, all the eluted metal ions cannot be adsorbed due to the low adsorption capability in the case that the excessive metal ions are eluted. In addition, when it is more than the upper limit, an amount of the proton conductive polymer decreases and thus proton ion transport is decreased.

The process for preparing a polymer electrolyte membrane using the polymer is a well-known process, so a detailed description thereof will be omitted.

For example, a polymer electrolyte membrane may be prepared by including the following process: a coating solution is prepared by mixing a proton conductive polymer and a metal ion adsorptive material in a solvent in the above-described range. The coating solution is coated on a releasing film by spraying, screen printing, a method using doctor blade, or a slot die method, and is dried to volatilize the solvent and then the releasing film is peeled off. The solvent includes a polar solvent such as water, an alcohol-based solvent such as methanol, ethanol, isopropyl alcohol, and the like, an amide-based solvent such as dimethylacetamide, a sulfoxide-based solvent such as dimethylsulfoxide, N-methylpyrrolidone, and the like.

According to yet another embodiment of the present invention, a polymer electrolyte membrane for a fuel cell is positioned between the anode and cathode to form a membrane-electrode assembly.

According to still another embodiment, a fuel cell system including either of the polymer electrolyte membranes may be provided. The fuel cell system includes at least one electricity generating element, a fuel supplier, and an oxidant supplier.

The electricity generating element includes a membrane-electrode assembly which includes one of the above polymer electrolyte membranes of the present invention, an anode and a cathode positioned at each side of the polymer electrolyte membrane, and separators, and it generates electricity through an electrochemical reaction of a fuel and an oxidant. The fuel supplier plays a role of supplying the electricity generating element with a fuel including hydrogen, and the oxidant supplier plays a role of supplying the electricity generating element with an oxidant. The fuel includes liquid or gas hydrogen or a hydrocarbon fuel such as methanol, ethanol, propanol, butanol, or natural gas, and the oxidant includes oxygen or air.

Figure 4:
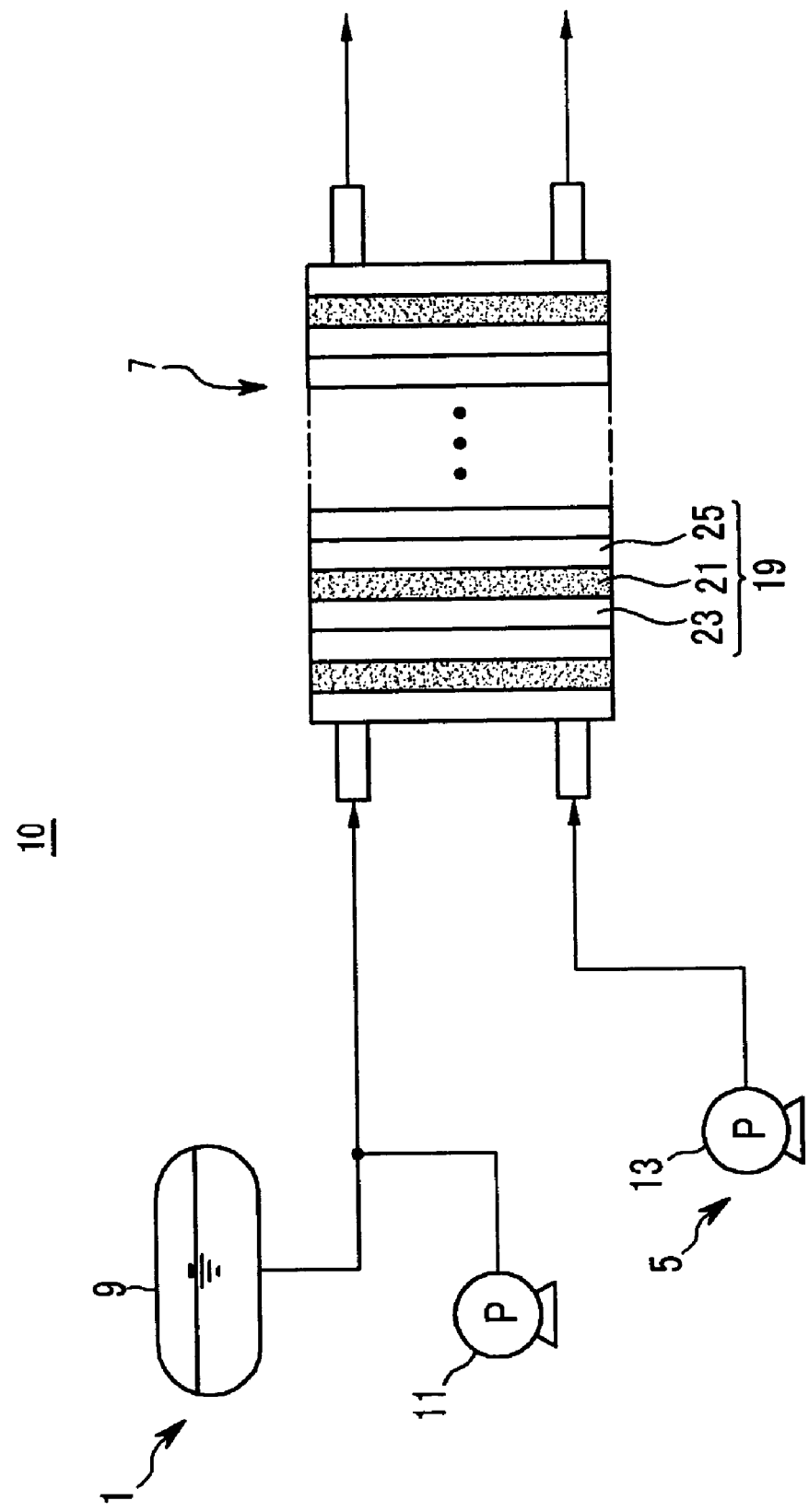
FIG. 4 is a schematic diagram illustrating a fuel cell system of the present invention.

FIG. 4 shows a schematic structure of a fuel cell system which will be described in details with the reference to this accompanying drawing, as follows.

A fuel cell system 10 includes a stack 7 composed of at least one electricity generating element 19 which generates electrical energy through an electrochemical reaction of a fuel and an oxidant, a fuel supplier 1 for supplying a fuel to the electricity generating element 19, and an oxidant supplier 5 for supplying an oxidant to the electricity generating element 19.

In addition, the fuel supplier 1 is equipped with a tank 9, which stores fuel, and a pump 11, which is connected therewith.

The fuel pump 11 supplies fuel stored in the tank 9 with a predetermined pumping power. The oxidant supplier 5, which supplies the electricity generating element 19 of the stack 7 with an oxidant, is equipped with at least one pump 13 for drawing in an oxidant with a predetermined pumping power. The electricity generating element 19 includes a membrane-electrode assembly 21, which oxidizes hydrogen or a fuel and reduces an oxidant, and separators 23 and 25 at each side thereof, which can supply hydrogen or a fuel and an oxidant, respectively.

The following examples illustrate the present invention in more detail. However, it is understood that the present invention is not limited by these examples.

EXAMPLES

Example 1

A polytetrafluoroethylene film having a thickness of 16 µm, a porosity of 70 volume %, and open-type micropores having an average diameter of 3 µm was prepared. Separately, polyacrylic acid for a metal ion adsorptive material was dissolved to a concentration of 3 weight % in water to prepare an aqueous solution. The resultant solution was mixed with a 15 weight % poly(perfluorosulfonic acid) (Nafion 112™, DuPont Inc)/alcohol solution.

The porous polytetrafluoroethylene film was dipped into the mixed solution and then dried, such that polyacrylic acid and poly(perfluorosulfonic acid) were filled in the micropores. The procedures were repeated several times to uniformly fill polyacrylic acid and poly(perfluorosulfonic acid) into the pores.

Following the procedure, a roll-pressing treatment was carried out to prepare a polymer electrolyte membrane having a uniform thickness.

Example 2

A polytetrafluoroethylene film having a thickness of 16 µm, a porosity of 70 volume %, and open-type micropores having an average diameter of 3 µm was prepared. Separately, polyacrylic acid for a metal ion adsorptive material was dissolved to a concentration of 3 weight % in water to prepare an aqueous solution.

A polyacrylic acid layer with a thickness of 1 µm was formed by dip-coating the polytetrafluoroethylene film in the polyacrylic acid aqueous solution and drying it.

The porous polytetrafluoroethylene film with the polyacrylic acid layer was dipped into a 15 weight % poly(perfluorosulfonic acid) (Nafion 112™, DuPont Inc)/alcohol solution, and then the solvent was volatilized such that poly (perfluorosulfonic acid) was filled in the micropores. The procedures were repeated several times to uniformly fill poly (perfluorosulfonic acid) into the pores. The poly(perfluorosulfonic acid) occupied 63 volume % of the entire electrolyte membrane.

Following the procedure, a roll-pressing treatment was carried out to prepare a polymer electrolyte membrane having a uniform thickness.

Example 3

A polytetrafluoroethylene film having a thickness of 20 µm, a porosity of 70 volume %, and micropores having an average diameter of 5 µm was prepared. Separately, 1 g of zeolite for a metal ion adsorptive material and 0.2 g of Nafion for a binder component were dispersed in 15 g of isopropyl alcohol to prepare a solution.

A polyacrylic acid layer with a thickness of 2 µm was formed by dip-coating the polytetrafluoroethylene film in a polyacrylic acid aqueous solution and drying it.

The porous polytetrafluoroethylene film with the polyacrylic acid layer was dipped into a 15 weight % poly(perfluorosulfonic acid) (Nafion 112™, DuPont Inc)/alcohol solution, then the solvent was volatilized and a poly(perfluorosulfonic acid) was filled in the micropores. The procedures were repeated several times to uniformly fill poly(perfluorosulfonic acid) into the pores. The poly(perfluorosulfonic acid) occupied 60 volume % of the entire electrolyte membrane.

Following the procedure, a roll-pressing treatment was carried out to prepare a polymer electrolyte membrane having a uniform thickness.

Example 4

A composition for forming a polymer electrolyte membrane was prepared by mixing 70 weight % (7 g) of poly (perfluorosulfonic acid) (Nafion112™, DuPont Inc) and 30 weight % (3 g) of a polyacrylic acid into 100 ml of dimethylacetate solvent. The composition was molded in a film shape to prepare a polymer electrolyte membrane with a thickness of 50 µm.

COMPARATIVE EXAMPLE 1

A polymer electrolyte membrane for a fuel cell was fabricated by impregnating poly(perfluorosulfonic acid) (Nafion112™, DuPont Inc) into a porous polytetrafluoroethylene film with the same method as in Example 2, except that the coating process of a polyacrylic acid aqueous solution of Example 2 was not carried out.

The polymer electrolyte membranes obtained from Examples 2 to 4 and Comparative Example 1 were stored in a 10 ppm $FeSO_4$ aqueous solution, and then ion conductivity was measured after 24 hours at 25☐, and a 100% humidifying condition. The results are shown at the following Table 1.

TABLE 1

| | Example 2 | Example 3 | Example 4 | Comparative Example 1 |
|---|---|---|---|---|
| Ion conductivity (S/cm) before $FeSO_4$ impregnation | 0.07 | 0.08 | 0.05 | 0.12 |
| Ion conductivity (S/cm) after $FeSO_4$ impregnation | 0.05 | 0.063 | 0.02 | 0.0015 |

From the measurement results, it is seen that ion conductivity was decreased by forming a complex of poly(perfluorosulfonic acid) and metal ions in the polymer electrolyte membrane for a fuel cell according to Comparative Example 1. However, the polyacrylic acid preferentially forms a complex with the metal ions in a polymer electrolyte membrane that includes polyacrylic acid coated on the polytetrafluoroethylene film according to Examples 2 and 3. Thereby, the decrease of ion conductivity was reduced.

The polymer electrolyte membrane for a fuel cell of the present invention is capable of minimizing an ion conductivity decrease thereof caused by metal ions generated from corrosion of a metal separator, and improving life-span characteristics.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer electrolyte membrane for a fuel cell, comprising:
    a porous supporter having pores; and
    a metal ion adsorptive material and a proton conductive polymer in the porous supporter, the metal ion adsorptive material comprising at least one selected from the group of a polymer having a —COOH group, a polymer having a —OH group, alumina, and a polymer having a chelating functional group.

2. The polymer electrolyte membrane of claim 1, wherein the metal ion adsorptive material and the proton conductive polymer are present in the pores of the porous supporter.

3. The polymer electrolyte membrane of claim 2, wherein the metal ion adsorptive material and the proton conductive polymer are present on the outer surface of the porous supporter.

4. The polymer electrolyte membrane of claim 1, wherein the porous supporter is a hygroscopic supporter having a swelling ratio of less than or equal to 5 weight%.

5. The polymer electrolyte membrane of claim 1, wherein the porous supporter has porosity ranging from 40 to 90 volume% of the entire volume of the porous supporter.

6. The polymer electrolyte membrane of claim 1, wherein the pores are three-dimensionally connected to each other.

7. The polymer electrolyte membrane of claim 1, wherein the pores have an average diameter ranging from 1 to 10μm.

8. The polymer electrolyte membrane of claim 7, wherein the metal ion adsorptive material layer has an average thickness ranging from 0.01 to 1 μm.

9. The polymer electrolyte membrane of claim 1, wherein the porous supporter is at least one selected from the group consisting of polyolefin, polyester, polysulfone, polyimide, polyetherimide, polyamide, polytetrafluoroethylene, rayon, and a glass fiber.

10. The polymer electrolyte membrane of claim 1, wherein the metal ion adsorptive metal is present in a metal ion adsorptive material layer formed on a surface of the pores of the porous supporter, and the proton conductive polymer formed on the metal adsorptive material layer to fill the pores.

11. The polymer electrolyte membrane of claim 1, wherein the metal ion adsorptive material is the polymer having a —COOH group or a —OH group.

12. The polymer electrolyte membrane of claim 1, wherein the metal ion adsorptive material is at least one selected from the group of polyacrylic acid, polymethacrylic acid, polyhydroxy alkyl methacrylate, alumina and a polymer having a chelating functional group.

13. The polymer electrolyte membrane of claim 1, wherein a proton conductive polymer is included at 40 to 90 volume% based on the entire volume of the polymer electrolyte membrane.

14. The polymer electrolyte membrane of claim 1, wherein the proton conductive polymer is a hygroscopic polymer having a swelling ratio of 5 to 50 weight%.

15. A polymer electrolyte membrane, comprising:
    a metal ion adsorptive material comprising at least one selected from the group of a polymer having a —COOH group, a polymer having a —OH group, alumina, and a polymer having a chelating functional group; and
    a proton conductive polymer.

16. The polymer electrolyte membrane of claim 15, wherein the metal ion adsorptive material is the polymer having a —COOH group or a —OH group.

17. The polymer electrolyte membrane of claim 15, wherein the proton conductive polymer is a hygroscopic polymer having a swelling ratio of 5 to 50 weight%.

18. The polymer electrolyte membrane of claim 15, wherein the metal ion adsorptive material and the proton conductive polymer are in a weight ratio of 5:95 to 50:50.

19. The polymer electrolyte membrane of claim 15, which is prepared by a method comprising:
    mixing the proton conductive polymer and the metal ion adsorptive material to prepare a coating solution; and
    coating the coating solution on a releasing film, drying it, and peeling off the resultant film.

20. A method for preparing a polymer electrolyte membrane for a fuel cell, comprising:
    preparing a porous supporter having pores;
    forming a metal ion adsorptive material on an inner surface of the pores to form a metal ion adsorptive material layer; and
    filling a proton conductive polymer in the pores having the inner surface on which the metal ion adsorptive material layer is formed.

21. A polymer electrolyte membrane prepared by the method of claim 20.

22. The method of claim 20, further comprising roll-pressing the polymer electrolyte membrane.

23. A membrane-electrode assembly comprising:
    an anode and a cathode facing each other; and
    a polymer electrolyte membrane positioned between the anode and cathode, the polymer electrolyte membrane comprising:
        a porous supporter having pores;
        a metal ion adsorptive material formed in the pores of the porous supporter, the metal ion adsorptive material comprising at least one selected from the group of a polymer having a —COOH group, a polymer having a —OH group, alumina, and a polymer having a chelating functional group; and
        a proton conductive polymer in the pores of the porous supporter.

24. The membrane-electrode assembly of claim 23, wherein the porous supporter is a hygroscopic supporter having a swelling ratio of less than or equal to 5 weight%.

25. The membrane-electrode assembly of claim 23, wherein the pores are three-dimensionally connected to each other.

26. The membrane-electrode assembly of claim 23, wherein the porous supporter is at least one selected from the group consisting of polyolefin, polyester, polysulfone, polyimide, polyetherimide, polyamide, polytetrafluoroethylene, rayon, and a glass fiber.

27. The membrane-electrode assembly of claim 23, wherein the polymer electrolyte membrane comprises:

the metal ion adsorptive material layer formed on an inner surface of the pores of the porous supporter; and a proton conductive polymer formed on the metal ion adsorptive material layer formed on the inner surface of the pores.

28. The membrane-electrode assembly of claim 27, wherein the metal ion adsorptive material layer has an average thickness ranging from 0.01 to 1 μm.

29. The membrane-electrode assembly of claim 23, wherein the metal ion adsorptive material is the polymer having a —COOH or a —OH group.

30. The membrane-electrode assembly of claim 23, wherein the metal ion adsorptive material is at least one selected from the group of polyacrylic acid, polymethacrylic acid, polyhydroxy alkyl methacrylate, zeolite, silica, and alumina.

31. The membrane-electrode assembly of claim 23, comprising a proton conductive polymer at 40 to 90 volume% based on the entire volume of the polymer electrolyte membrane.

32. The membrane-electrode assembly of claim 23, wherein the proton conductive polymer is a hygroscopic polymer having a swelling ratio of 5 to 50 weight%.

* * * * *